Figure 1:
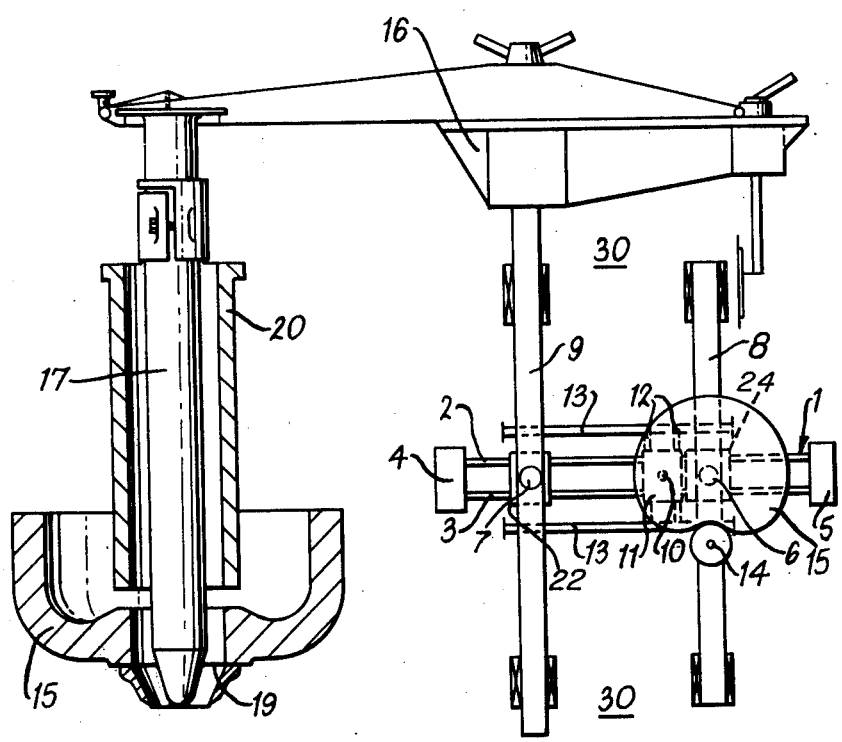

United States Patent [19]

Vlk

[11] 4,013,439
[45] Mar. 29, 1977

[54] GOB FORMING APPARATUS

[75] Inventor: Petr Vlk, Wembley, England

[73] Assignee: British Hartford-Fairmont Limited, England

[22] Filed: May 8, 1975

[21] Appl. No.: 575,693

[30] Foreign Application Priority Data

May 13, 1974 United Kingdom .............. 21076/74

[52] U.S. Cl. .................................. 65/330; 65/129; 74/571 L; 74/600
[51] Int. Cl.² ..................... C03B 9/00; G05G 1/00
[58] Field of Search .................. 65/330, 331, 129; 74/571 L, 600

[56] References Cited

UNITED STATES PATENTS

| | | | |
|---|---|---|---|
| 1,582,725 | 4/1926 | Bethel et al. | 65/330 |
| 2,689,730 | 9/1954 | Tebbs | 74/600 X |
| 2,725,681 | 12/1955 | Wythe | 65/330 |
| 2,749,665 | 6/1956 | Peiler | 65/330 |
| 2,834,218 | 5/1958 | Lovell | 74/600 X |

Primary Examiner—Robert L. Lindsay, Jr.
Assistant Examiner—Frank W. Miga
Attorney, Agent, or Firm—Cushman, Darby & Cushman

[57] ABSTRACT

The invention provides a linkage for transmitting axial reciprocating movement from one shaft to a parallel shaft and comprising a bar pivotally mounted at a fixed but adjustable position relative to the shafts, the bar being pivotally mounted at a fixed position on the bar, a pivotal connection fixed on one axial shaft and slidably mounted on the bar to one side of its fixed mounting, and a pivotal connection fixed on the other axial shaft and slidably mounted on the bar to the other side of its fixed mounting. The linkage may especially be used in the drive of the plunger of gob forming apparatus for use in the production of glassware whereby by adjustment of the linkage the plunger stroke and height may be varied.

6 Claims, 3 Drawing Figures

GOB FORMING APPARATUS

This invention relates to a linkage.

In industry the use of linkages is well known for conveying drive from one part of an apparatus to another. Generally the linkage is adjustable so that the mode of use of a particular apparatus is changeable.

For example in the manufacture of glassware, particularly of glass bottles, gobs are obtained by forcing molten glass through an orifice in the floor of a refractory spout containing the molten glass. The glass is forced through the orifice by means of an axially reciprocating plunger above the orifice. The gob is so formed as cut off and removed for further processing. The desired gob size will vary according to the glassware (e.g. large or small bottle) to be made and gob size itself depends on the length of plunger stroke and the height of the plunger with respect to the orifice. Therefore this stroke length and height must be adjustable if the gob forming apparatus is to be used in the production of more than one size of glassware.

In conventionally used gob-forming apparatus the plunger is driven by means of a cam; the cam follower being connected to the plunger via a freely mounted adjustable linkage. However it has been found that with such linkage assemblies the rate of operation of the plunger is restricted, generally to about 100 strokes per minute. Gob formation may of course be increased by the use of multiple gob forming device. However, even then, this restricted plunger stroke rate has been found unsatisfactory for present day manufacturing speeds. Further, in use, such freely mounted linkage assemblies rock up and down with the cam follower. This means that any adjustment of the linkage assembly during operation is very difficult as the adjusters mounted on the arms of the linkage are constantly moving. In practice it is generally necessary to stop the whole apparatus in order to effect adjustment of the linkage.

According to the present invention there is provided a linkage for transmitting axial reciprocating movement from one shaft to a parallel shaft and comprising a bar pivotally mounted at a fixed but adjustable position relative to the shafts, the bar being pivotally mounted at a fixed position on the bar, a pivotal connection fixed on one axial shaft and slidably mounted on the bar to one side of its fixed mounting, and a pivotal connection fixed on the other axial shaft and slidably mounted on the bar to the other side of its fixed mounting.

The invention also provides apparatus having a drive containing a linkage according to the invention. In particular the invention provides gob forming apparatus for use in the production of glassware which apparatus comprises a refractory spout for molten glass and having an orifice in its floor, and, cooperating with the orifice, an axially reciprocating plunger, the plunger being connected to drive means through a linkage according to the invention.

In use of the linkage of the present invention, a first of the shafts is driven to reciprocate along its axis and this drive is transmitted along the pivotally mounted bar to displace, and thus drive, the second shaft. The pivotaly mounting of the bar is fixed and thus the pivot point of the bar remains stationary with the bar pivoting about it. As the pivot point remains stationary in use the adjustment of its position during use is simplified since the means of adjustment can also be stationary in use. In this way the linkage of the present invention can be adjusted without great difficulty and also without the necessity of stopping apparatus to effect the adjustment.

The amount of displacement of the second shaft will depend on the displacement of the first shaft (which will generally remain constant for a given apparatus) and also on the relative distances between the first shaft and the fixed pivot of the bar and between the second shaft and the fixed pivot. When the position of the pivotal mounting of the bar is adjusted relative to the axial shafts the bar slides within the mountings on the shafts. Thus depending on the direction of adjustment the distance of the pivotal mounting of the bar from one shaft is increased and from the other shaft is decreased. By adjustment in this way accordingly the displacement of the second shaft from the bar pivot point is varied. In particular the closer the pivotal mounting is to the first shaft the longer the stroke transmitted to the second shaft and the closer the pivotal mounting is to the second shaft the shorter the transmitted stroke.

In order to give greater flexibility in use it is preferred that the position of the pivotal mounting of the bar is adjustable in a first direction parallel to the axial shafts and in a second direction perpendicular thereto. In this way not only may the length of the transmitted stroke be varied but also the height of the linkage (and therefore of apparatus attached thereto) may be varied. This is particularly advantageous in gob forming apparatus since it enables the height of the plunger (mounted on a shaft) above the orifice to be conveniently adjustable.

To provide this greater flexibility in use preferably the bar is pivotally mounted on an adjustable member mounted on a first rod parallel to the axial shafts such that the position of the adjustable member along the first rod is adjustable and the first rod is mounted on a second fixed rod perpendicular thereto such that the position of the first rod along the second rod is adjustable. Thus by adjustment of the position of the said member along the first rod, the position of the pivotal mounting of the bar is adjusted in the said second direction i.e. the height of the linkage may be adjusted. Similarly by adjustment of the position of the first rod (and thus also the said member) along the second rod adjustment in the said first direction is effected and the transmitted stroke length altered.

The adjustment of the position of the pivotal mounting of the bar may be effected by conventional means e.g. by a turn screw.

The bar of the present linkage suitably comprises at least two parallel rods, the rods having mounted thereon two slidable members each of which is pivotally fixed to one of the axial shafts and there being fixed to the rods, between the two slidable members, a fixed member by which the bar is pivotally mounted at the fixed but adjustable position. Then to adjust the position of the pivotal mounting of the bar relative to the axial shafts the position of the fixed member is adjusted. Thus the rods are caused to move with the fixed member and they slide within the slidable members pivotally fixed to the axial shafts. Preferably the fixed member is releasable and the rods are removable from the linkage. This is with a view to their replacement in event of failure.

Figure 2:
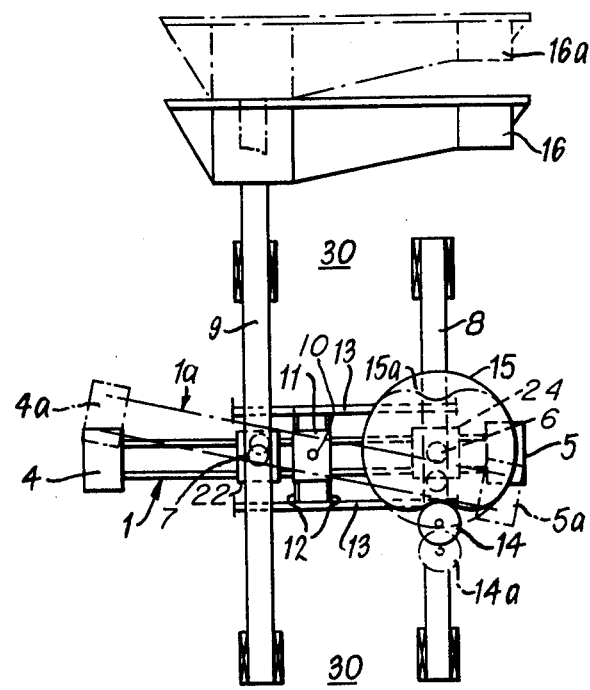
Figure 3:
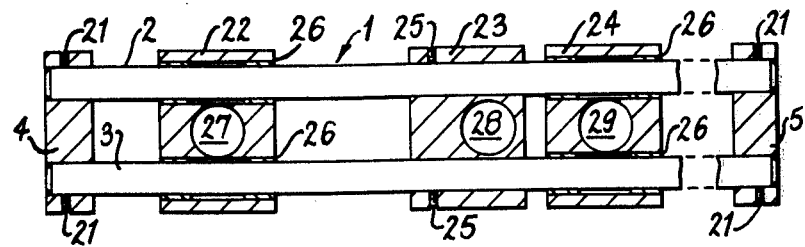

The invention is further illustrated in the accompanying drawings with reference to glass gob formation. It will of course be appreciated that the invention has a wider application. In the drawings:

FIG. 1 shows, part in section, a glass gob-forming apparatus including a linkage according to the invention, FIG. 2 shows the linkage of FIG. 1 including, in dash-and-dotted line and indicated with superscript a, the position of the various components on movement of the linkage, and FIG. 3 is an enlarged section through the bar of the linkage of FIGS. 1 and 2. With reference to FIGS. 1 and 2 the linkage comprises a bar 1 having parallel rods 2 and 3 joined, at each end, by slidably removable end pieces 4 and 5. [The construction of this bar is discussed in greater detail hereinafter with reference to FIG. 3.]

Bar 1 is pivotally connected, at 6 and 7, to parallel columns 8 and 9 respectively. These columns are constrained by casing 30 for vertical movement only. Also, between points 6 and 7, bar 1 is pivotally mounted, at a fixed position 10 on the bar, on a member 11. Member 11 is itself mounted on parallel bars 12 such that its position along bars 12, i.e. in a direction parallel to columns 8 and 9, is adjustable. Bars 12 are themselves mounted on parallel bars 13, which are rigidly mounted on the main apparatus frame, such that their position (the position of the bars 12) along bars 13 is adjustable i.e. in a direction perpendicular to columns 8 and 9.

Column 8 carries a cam follower 14 which cooperates with a cam 15 such that during rotation of cam 15 the cam follower 14, and therefore also column 8, reciprocate up and down.

Mounted on column 9 (see FIG. 1) is the arm 16 of the gob-former. A plunger 17 mounted on the end of arm 16 extends down into a refractory spout 18 which is fed with molten glass (e.g. from a furnace not shown). The weight of arm 16 and plunger 17 on column 9 ensure contact of cam follower 14 on the column 8 with cam 15 during the whole of the cam's revolution.

The spout 18 has an orifice 19 which cooperates with plunger 17. Plunger 17 is surrounded by a tube 20 of refractory material which can be driven to rotate around plunger 17 and thus stir molten glass in spout 18.

Turning now to FIG. 3 of the drawings, this shows in greater detail the construction of bar 1. There are shown the two rods 2 and 3, the ends of which fit into end pieces 4 and 5 where they are held by screws 21. Further the rods 2 and 3 pass through three blocks 22, 23 and 24. Block 23 is fixed on rods 2 and 3 by screws 25 while the rods 2 and 3 pass through bushes 26 in blocks 22 and 24 to allow for the reciprocating movement. Through each of blocks 22, 23 and 24 is a hole 27, 28 and 29 respectively.

In the assembled linkage the bar is pivotally mounted, at 6 and 7, on columns 8 and 9 by means of pivot pins extending from the columns through holes 29 and 27 respectively. Also a pin through hole 28 pivotally mounts the bar 1 on the adjustable member 11.

In use molten glass is supplied to spout 18 and refractory tube 20, surrounding plunger 17, is set in rotation mixing the molten glass.

Drive is imparted to cam 15 which during its rotation cooperates with cam follower 14 causing the follower and the column 8 on which it is mounted to reciprocate up and down. Thus bar 1 pivotally mounted at 6 in column 8 is caused to reciprocate up and down with the column. The bar 1 will pivot about point 10 which is fixed with respect to the main frame of the apparatus. Accordingly bar 1 at point 7 will move down and up with the up down movement of 6. [See the position of $1^a$ in FIG. 2.]

Column 9 will of course move with bar 1 at 7 and thus arm 16 and plunger 17 will be caused to reciprocate down and up. As plunger 17 moves down molten glass is forced down from spout 18 through orifice 19 to form a gob. The plunger then returns upwards ready for the next stroke and the gob is cut off and removed for further processing.

The distance which the bar 1 at 7 moves up and down and the length of stroke of plunger 17 will depend on the distance of movement of the bar at 6 and also on the ratio of the distances of 10 from 6 and 10 from 7. For a given cam 15 the distance of movement of the bar at 6 is fixed.

However the bar 1 is pivotally mounted at 10 and the member 11 is adjustably mounted on bars 12 and bars 12 are adjustably mounted on bars 13. Accordingly by adjustment (e.g. with a set screw) of the position of bars 12 on bars 13, the position of member 11 with respect to columns 8 and 9 may be altered (c.f. the difference in the positions of member 11 shown in FIGS. 1 and 2). By such an adjustment block 23 pivotally mounted at 10 on member 11 will be moved with member 11 with respect to column 8 and 9. With block 23 will be moved the whole assembly of bar 1 viz. rods 2 and 3 and end pieces 4 and 5; the rods 2 and 3 sliding through bushes 26 in blocks 22 and 24. In this way the ratio of the distance of 10 from 6 to the distance of 10 from 7 and thus also the length of the stroke of plunger 17 are altered. In particular the closer 10 is to 6 the longer the stroke and the closer 10 to 7 the shorter the stroke.

In addition the position of member 11 on bars 12 perpendicular to bars 13 may be altered. By moving the position of member 11 up or down on bars 12 bar 1 and the whole linkage assembly is raised or lowered. Thus the height of plunger 17, carried on arm 16 (see $16^a$ of FIG. 2) attached to the linkage assembly, with respect orifice 19 is altered.

As explained above adjustment of the plunger stroke and/or height results in alteration in gob size, thus making the apparatus suitable for use in the production of various sizes of glassware.

We have found that this linkage assembly, wherein bar 1 moves around a pivot 10 mounted on the main frame of the apparatus, may be used to obtain a higher plunger stroke rate (e.g. of the order of 150 strokes per minute) than the conventional freely mounted linkage assemblies. The apparatus is illustrated in single gob form though it will of course be appreciated that the linkage assembly may equally be used for multiple gob apparatus.

Further as bars 13 are on the main frame of the apparatus the position of adjustable member 11 with respect to the bars 13 may be adjusted by means which remain static even during operation of the apparatus. Similarly the position of adjustable member 11 on bars 12 may be adjusted with static adjusters. The fact that the adjusters remain static of course simplifies adjustment of the position of pivot point 10 (and thus of the size of the gobs) even when the apparatus is running. The construction of these position adjusters may be totally conventional and accordingly it has been considered unnecessary to illustrate them in the accompanying drawings.

Moreover repair of the linkage assembly in the event of a failure of rods 2 and/or 3 of bar 1 or bushes 26 in blocks 22 and/or 24 is relatively easy. This may be achieved by simply removing the pivot pins at 6, 7 and 10, withdrawing the faulty assembly and replacing it by a new one, replacing the pivot pins and securing them again.

I claim as my invention:

1. Gob forming apparatus for use in the production of glassware which apparatus comprises a refractory spout for molten glass and having an orifice in its floor, and, cooperating with the orifice, an axially reciprocating plunger, the plunger being mounted on an axially reciprocating shaft and a linkage for transmitting axial reciprocating movement to said shaft from a parallel shaft which is reciprocated by a drive means, the linkage comprising a bar; means pivotally mounting said bar, at a fixed position on the bar intermediate the ends of said bar, to a mounting member; means for adjusting the position of said mounting member in a direction parallel to said shafts and in a direction perpendicular to said shafts; a pivotal connection fixed on one axial shaft and slidably mounted on the bar to one side of said fixed position; and a pivotal connection fixed on the other axial shaft and slidably mounted on the bar to the other side of said fixed position.

2. Gob forming apparatus according to claim 1 wherein said adjustable mounting member is mounted on a first rod parallel to the axial shafts such that the position of the adjustable member along the first rod is adjustable and the first rod is mounted on a second fixed rod perpendicular thereto such that the position of the first rod along the second rod is adjustable.

3. Gob forming apparatus according to claim 1 wherein the bar of the said linkage comprises at least two parallel rods, wherein said pivotal connections between said bar and said axial shafts include two members slidably mounted on said parallel rods, each of said members being pivotally fixed to one of said axial shafts, and wherein said means pivotally mounting said bar to an adjustable mounting member includes a member fixed to said two parallel rods and a pivotal connection between said fixed member and said adjustable mounting member.

4. Apparatus for reciprocating an element comprising: first and second parallel axially movable shafts; means connecting said element to said first shaft for movement therewith; drive means for imparting axially reciprocating movement to said second shaft; a bar which transmits axial movement of said second shaft to said first shaft; means mounting said bar at a location near one end thereof to said first shaft for pivotal movement relative to a fixed location on said first shaft and for sliding movement relative to said first shaft in a direction axial of said bar; means mounting said bar at a location near the other end thereof to said second shaft for pivotal movement relative to a fixed location on said second shaft and for sliding movement to said second shaft in a direction axial of said bar; a mounting member and means for adjusting the same in a first direction parallel to said shafts and in a second direction perpendicular to said shafts; and means pivotally mounting said bar to said mounting member at a fixed location on said bar between said fixed locations, whereby adjustment of said mounting member in said first direction adjusts the position of said bar, said shafts, said connecting means and said element in a direction parallel to said shafts and whereby adjustment of said mounting member in said second direction adjusts the stroke of said first shaft.

5. Apparatus as in claim 4 wherein said means for adjusting said mounting member in said first and second directions includes a first rod parallel to said shafts and a second fixed rod perpendicular to said shafts, said mounting member being mounted on said first rod for adjustment therealong, and said first rod being mounted on said fixed second rod for adjustment therealong.

6. Apparatus as in claim 4 wherein said bar comprises two parallel rods, wherein said means mounting said bar to said parallel shafts includes two members slidably mounted on said parallel rods, one of said members being pivoted to said first shaft at the respective fixed location and the other member being pivoted to said second shaft at the respective fixed location, said mounting member being pivotally connected to a member which is fixed on said two parallel rods.

* * * * *